United States Patent
Apte et al.

(10) Patent No.: US 9,354,869 B2
(45) Date of Patent: *May 31, 2016

(54) BUILDING A PATTERN TO DEFINE A TOPOLOGY AND APPLICATION ENVIRONMENT USING SOFTWARE COMPONENTS AND SOFTWARE UPDATES/FIXES FROM EXTERNAL REPOSITORIES FROM MULTIPLE VENDORS

(71) Applicant: International Business Machines Corporation, Armonk, NY (US)

(72) Inventors: Ajay A. Apte, Austin, TX (US); Jingrong Gao, Richmond Hill (CA); Aaron J. Quirk, Cary, NC (US); Lin Sun, Morrisville, NC (US); Li Yi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,759

(22) Filed: Feb. 10, 2015

(65) Prior Publication Data
US 2016/0011866 A1 Jan. 14, 2016

Related U.S. Application Data

(63) Continuation of application No. 14/329,955, filed on Jul. 13, 2014.

(51) Int. Cl.
*G06F 9/44* (2006.01)
*G06F 9/445* (2006.01)

(52) U.S. Cl.
CPC ... *G06F 8/71* (2013.01); *G06F 8/65* (2013.01)

(58) Field of Classification Search
None
See application file for complete search history.

(56) References Cited

U.S. PATENT DOCUMENTS 8,527,578 B2 * 9/2013 DeHaan .................. 709/203
8,544,016 B2 * 9/2013 Friedman et al. ........ 718/104

(Continued)

FOREIGN PATENT DOCUMENTS

WO 2013158783 A1 10/2013

OTHER PUBLICATIONS

IBM, "Tivoli Service Automation Manager," http://www-03.ibm.com/software/products/en/serviceautomationmanager, 2014, pp. 1-3.

(Continued)

*Primary Examiner* — Isaac T Tecklu
(74) *Attorney, Agent, or Firm* — Robert A. Voigt, Jr.; Winstead, P.C.

(57) ABSTRACT

A method, system and computer program product for building a pattern. An external framework engine identifies the software components, as well as code updates and/or code fixes, from the external repositories associated with different vendors. The framework engine then generates metadata using the identified software components and code updates and/or code fixes which may be used to determine the relationships between the software components. Furthermore, the framework engine generates configuration metadata to successfully link software components with a relationship. The framework engine then displays the software components available to be used to build the pattern, including the relationship linkages between the software components with a relationship along with the configuration metadata required to make a successful linkage. In this manner, the user will be able to build a pattern using software components provided from different vendors and be able to understand the relationship linkages between the software components.

5 Claims, 6 Drawing Sheets

(56) References Cited

U.S. PATENT DOCUMENTS

| | | | | |
|---|---|---|---|---|
| 8,612,976 | B2* | 12/2013 | Arnold et al. | 718/1 |
| 8,640,122 | B2* | 1/2014 | DeHaan | 717/174 |
| 2005/0102666 | A1* | 5/2005 | Barta et al. | 717/174 |
| 2005/0102667 | A1* | 5/2005 | Barta et al. | 717/174 |
| 2007/0157191 | A1* | 7/2007 | Seeger et al. | 717/168 |
| 2013/0232480 | A1* | 9/2013 | Winterfeldt et al. | 717/177 |
| 2013/0332590 | A1* | 12/2013 | Mohaban et al. | 709/223 |

OTHER PUBLICATIONS

Alfredo Olivieri, "Tivoli Service Automation Manager 7.2.2 Makes Life Easier for Cloud Service Providers," http://thoughtsoncloud.com/2012/01/tsam-7-2-2-strengthens-it-service-delivery-capabilities-in-privateand-public-clouds, Jan. 5, 2012, pp. 1-5.

Mell et al., "The NIST Definition of Cloud Computing," Special Publication 800-145, Sep. 2011, pp. 1-7.

List of IBM Patents or Patent Applications Treated as Related, 2015, pp. 1-2.

Office Action for U.S. Appl. No. 14/329,955 dated Apr. 28, 2015, pp. 1-13.

List of IBM Patents or Patent Applications Treated as Related, May 12, 2015, pp. 1-2.

Office Action for U.S. Appl. No. 14/329,955 dated Sep. 28, 2015, pp. 1-18.

* cited by examiner

BUILDING A PATTERN TO DEFINE A TOPOLOGY AND APPLICATION ENVIRONMENT USING SOFTWARE COMPONENTS AND SOFTWARE UPDATES/FIXES FROM EXTERNAL REPOSITORIES FROM MULTIPLE VENDORS

TECHNICAL FIELD

The present invention relates generally to cloud computing, and more particularly to building a pattern to define a topology and application environment using software components and software updates/fixes from external repositories from multiple vendors.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of the physical resources of the computer. A guest operating system runs on each guest, and the guest appears to the guest operating system as a real computer. Each guest operating system may host one or more virtual machines.

An administrator of the cloud computing environment may build a reusable pattern which defines the topology and application environment used to service the customer (i.e., the user receiving the services provided by the cloud computing environment) as well as satisfies the customer requirements, such as application and processing requirements. The pattern is an abstract model of the topology and application environment that encapsulates the installation, configuration and management of middleware and applications, such as the middleware and applications that run on the virtual machines in the physical cloud computing nodes. Such a pattern can be deployed repeatedly thereby avoiding the need to provision these environments individually and manually.

Currently, such a pattern is built using only the software components that are accessible from external repositories from the same vendor. Patterns cannot currently be built using software components from separate external repositories from different vendors. As a result, it becomes more difficult to build a pattern that satisfies the customer's requirements. Furthermore, since patterns can only be built using software components stored in external repositories from the same vendor, there is not currently a means for deriving relationships between various software components from different vendors.

BRIEF SUMMARY

In one embodiment of the present invention, a method for building a pattern comprises identifying software components available from a plurality of external repositories associated with multiple vendors. The method further comprises identifying code updates and/or code fixes for software components stored in the plurality of external repositories. The method additionally comprises generating metadata using the identified software components and the identified code updates and/or code fixes. Furthermore, the method comprises determining, by a processor, relationships between the identified software components using the metadata. Additionally, the method comprises generating configuration metadata to successfully link software components with a relationship. In addition, the method comprises displaying the identified software components available to be used to build the pattern as well as relationship linkages between the software components with the relationship along with the configuration metadata.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for building a pattern. In one embodiment, an external framework engine of the pattern engine (configured to build a pattern) identifies the software components available from the external repositories associated with different vendors. Furthermore, the external framework engine identifies the code updates and/or code fixes (e.g., interim fixes, fix packs) for the software components stored in the repositories. The external framework engine then generates metadata using the identified software components and identified code updates and/or code fixes which may be used to determine the relationships between the software components. For example, the metadata may include information, such as name, description, products that the update supports, update classification, download URL, applicability rules, and so on. The metadata may be used to determine any relationships between the software components. Furthermore, the external framework engine generates configuration metadata to successfully link software components with a relationship. The configuration metadata includes data that is required to make a successful linkage (e.g., database name, port) between the software components. The external framework engine then displays the software components available to be used to build the pattern, including the relationship linkages between the software components with a relationship along with the configuration metadata required to make a successful linkage. In this manner, the user will be able to build a pattern using software components and code updates and/or code fixes provided from different vendors. Furthermore, the user will be able to understand the relationship linkages between the software components and be able to provision these software components along with the linkages dynamically.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as Follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as Follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as Follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
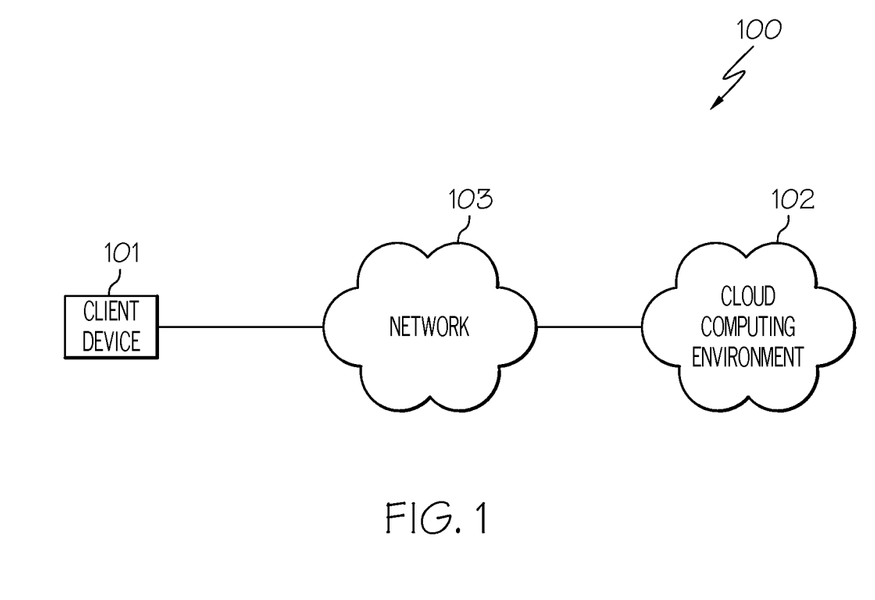
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
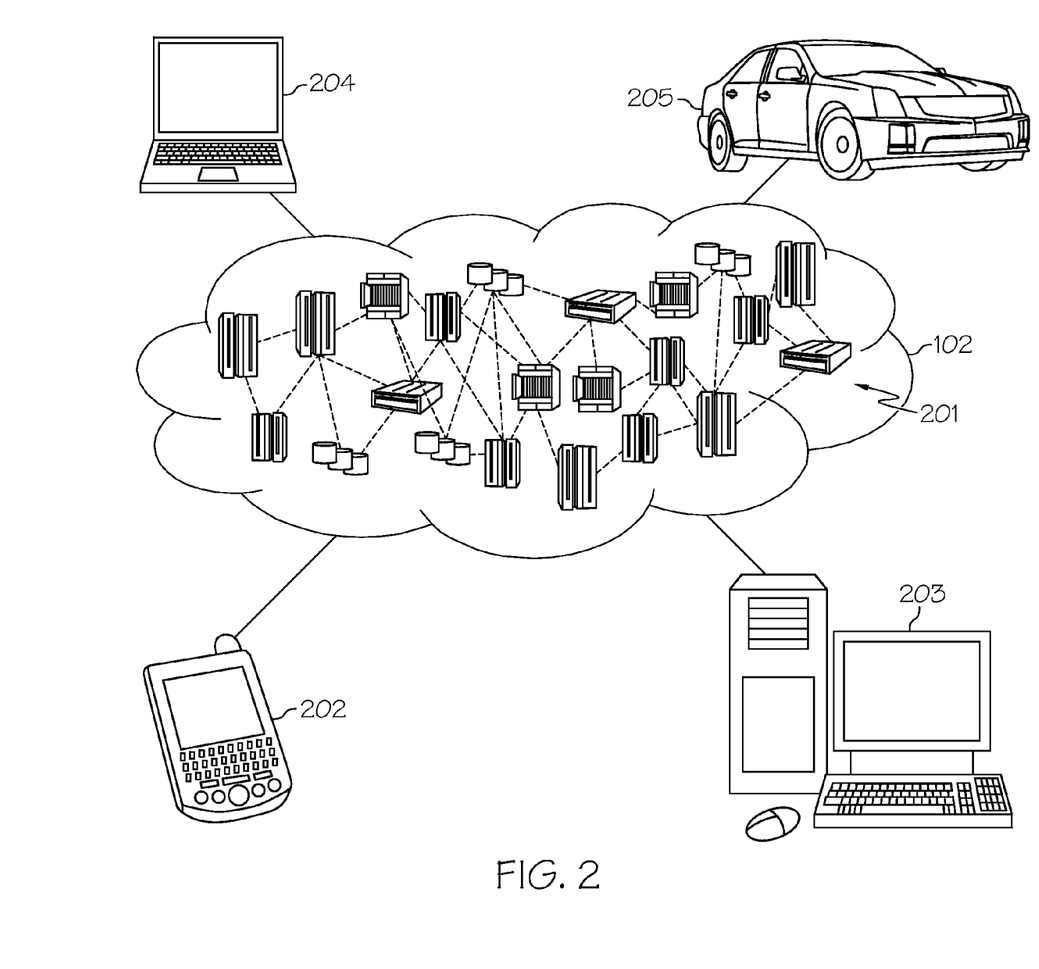
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
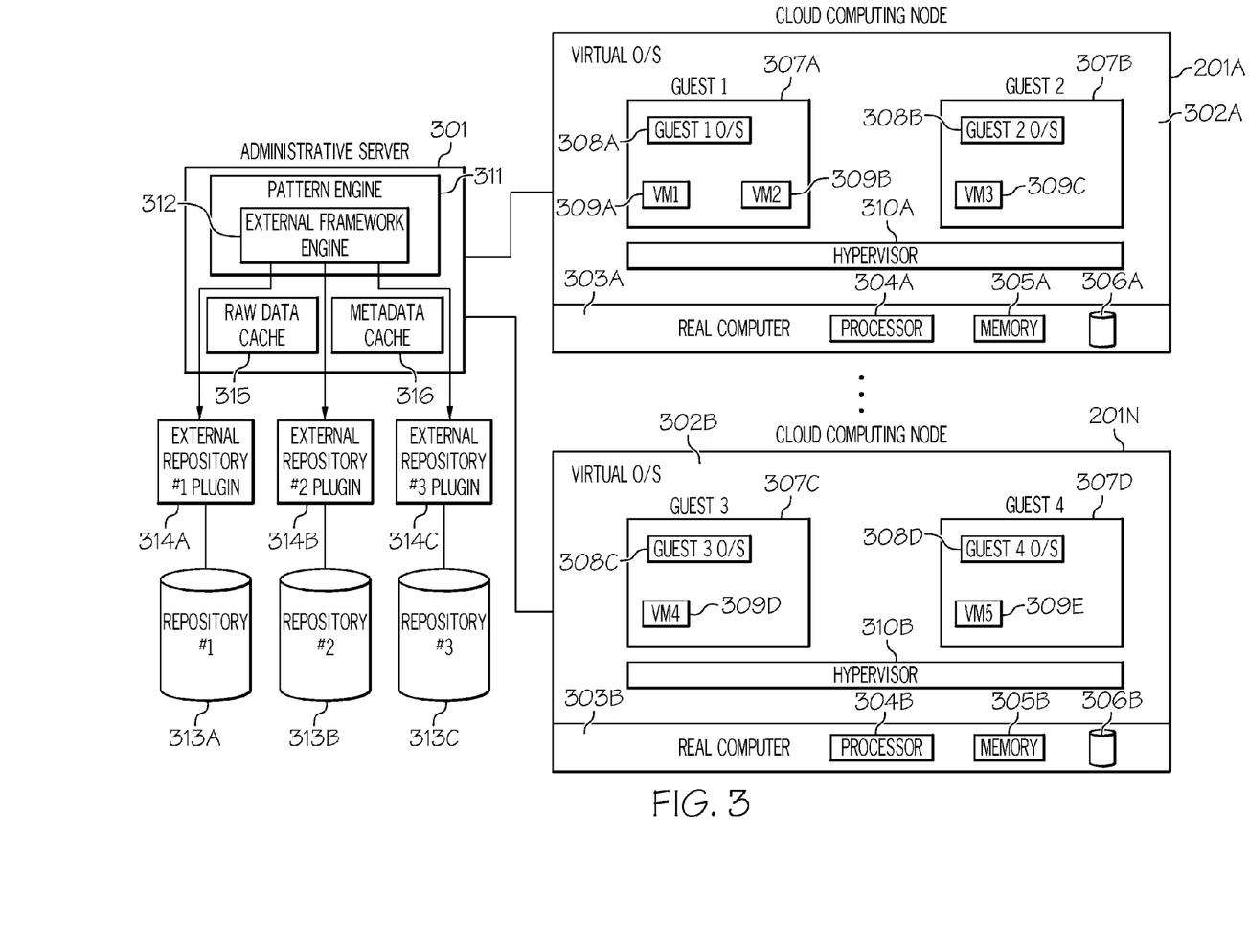
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N, where N is a positive integer number, in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to an administrative server 301 configured to provide data center-level functions of communicating with hypervisors on cloud computing nodes 201 to install virtual machines, terminate/suspend virtual machines and relocate virtual machines from one cloud computing node 201 to another within the data center. A description of the hardware configuration of administrative server 301 is provided further below in connection with FIG. 4.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1" and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2," and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3" and "Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, administrative server 301 supports a module, referred to herein as the pattern engine 311, configured to build a pattern to be provisioned at the virtual machine deployment time. A "pattern," as used herein, refers to an abstract model of the topology and application environment that encapsulates the installation, configuration and management of middleware and applications, such as the middleware and applications that run on virtual machines 309. Such a pattern can be deployed repeatedly thereby avoiding the need to provision these environments individually and manually.

In one embodiment, pattern engine 311 includes a module, referred to herein as the external framework engine 312, configured to enable the building of the pattern using software components from external repositories from different vendors as discussed further below.

As illustrated in FIG. 3, external framework engine 312 is connected to various repositories, such as repositories 313A-313C (identified as "Repository 1," "Repository 2," and "Repository 3," respectively, in FIG. 3) via plugins 314A-314C, respectively (identified as "External Repository 1 Plugin," "External Repository 2 Plugin," and "External Repository 3 Plugin," respectively, in FIG. 3). Repositories 313A-313C may collectively or individually be referred to as repositories 313 or repository 313, respectively. Furthermore, plugins 314A-314C may collectively or individually be referred to as plugins 314 or plugin 314, respectively.

In one embodiment, repositories 313 store software components (e.g., application server, database server) as well as any software updates and/or fixes for any of the software components stored in repository 313. These repositories 313 may be associated with different vendors. That is, each repository 313 may store software components (e.g., application server, database server) as well as any software updates and/or fixes for any of the software components stored in repository 313 for a specific vendor. As a result, a group of repositories 313 may store software components as well as any software updates and/or fixes for various vendors. While FIG. 3 illustrates three repositories 313, the present invention is not to be limited in scope to any particular number of repositories 313. Furthermore, multiple repositories 313 (e.g., repositories 313A-313B) may store software components as well as any software updates and/or fixes from the same vendor; however, the entire group of repositories 313 (e.g., repositories 313A-313C) will store software components as well as any software updates and/or fixes from different vendors.

As discussed above, external framework engine 312 is connected to various repositories 313 via plugins 314. A plugin 314, as used herein, refers to a software component that enables external framework engine 312 to query or access repository 313 for a particular vendor. For example, plugin 314A enables external framework engine 312 to access repository 313A. In another example, plugin 314B enables external framework engine 312 to access repository 313B and plugin 314C enables external framework engine 312 to access repository 313C. As a result, each plugin 314 may be specifically tailored to allow external framework engine 312 to identify software components, including any new software components, as well as any software updates and/or fixes in repository 313 for that vendor as discussed further below in connection with FIGS. 5A-5B. In one embodiment, the identified software components as well as any software updates and/or fixes may be stored in a cache 315 (labeled as "Raw Data Cache" in FIG. 3).

External framework engine 312 uses the identified software components as well as any software updates and/or fixes to generate metadata to be used to determine the relationships between the software components. For example, the metadata may include information, such as name, description, products that the update supports, update classification, download URL, applicability rules, and so on. The metadata may be used to determine any relationships between the software components. In one embodiment, the metadata may be stored in a cache 316 (labeled as "Metadata Cache" in FIG. 3).

External framework engine 312 may further be configured to generate configuration metadata to successfully link the software components with a relationship. In one embodiment, the configuration metadata may be stored in cache 316. In this manner, software components (e.g., application server, database server) with a relationship linkage can be presented to the user (e.g., presented via a user interface of client device 101 of FIG. 1) along with configuration metadata required to make a successful linkage (e.g., database name, port). At provisioning time, the software components along with the linkages are dynamically provisioned as discussed further below in connection with FIGS. 5A-5B.

Figure 4:
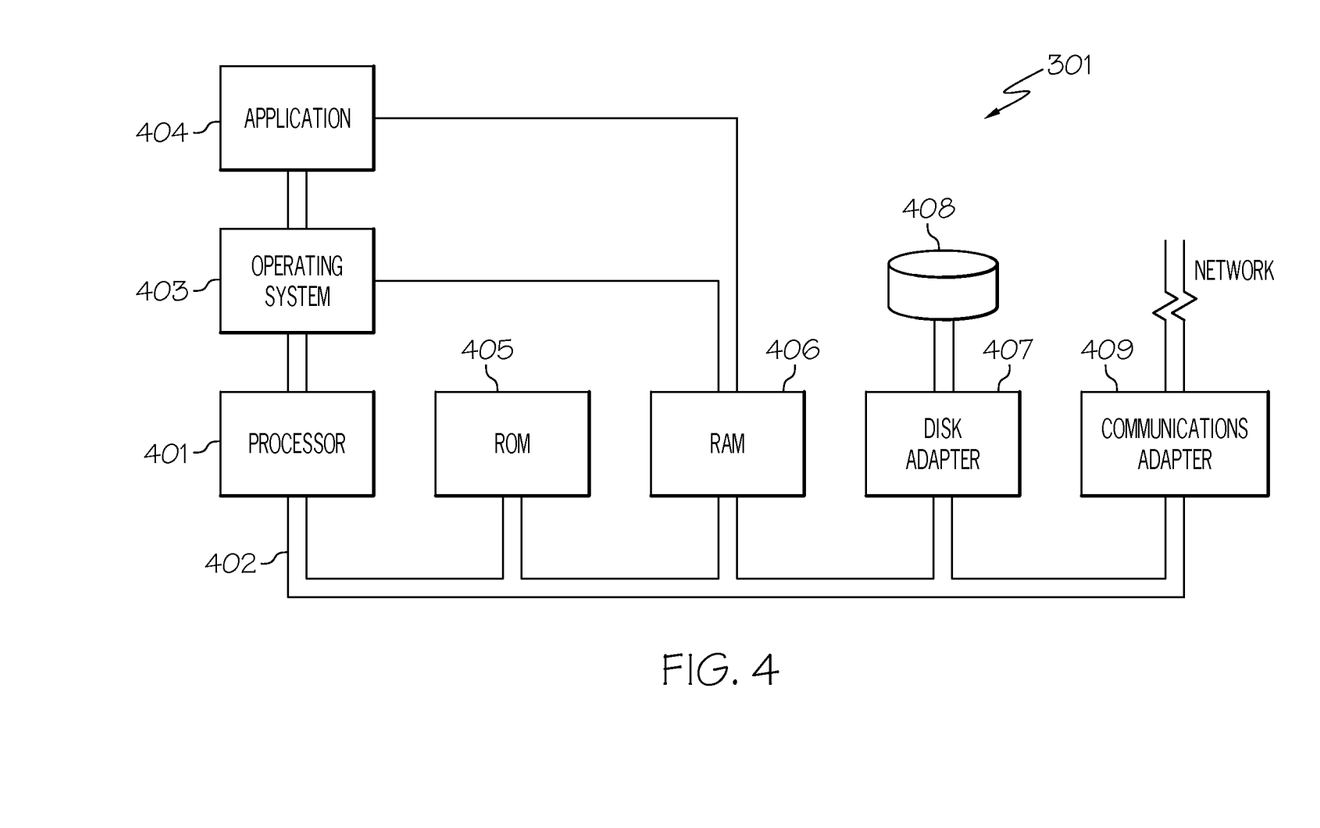
FIG. 4 illustrates a hardware configuration of an administrative server configured in accordance with an embodiment of the present invention.

Referring now to FIG. 4, FIG. 4 illustrates a hardware configuration of administrative server 301 (FIG. 3) which is representative of a hardware environment for practicing the present invention. Administrative server 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program (e.g., external framework engine 312 of FIG. 3) for building a pattern using software components from external repositories 313 (FIG. 3) from different vendors as discussed further below in association with FIGS. 5A-5B.

Referring again to FIG. 4, read-only memory ("ROM") 405 is coupled to system bus 402 and includes a basic input/output system ("BIOS") that controls certain basic functions of administrative server 301. Random access memory ("RAM") 406 and disk adapter 407 are also coupled to system bus 402. It should be noted that software components including operating system 403 and application 404 may be loaded into RAM 406, which may be administrative server's 301 main memory for execution. Disk adapter 407 may be an integrated drive electronics ("IDE") adapter that communicates with a disk unit 408, e.g., disk drive. It is noted that the program for building a pattern using software components from external repositories 313 from different vendors, as discussed further below in association with FIGS. 5A-5B, may reside in disk unit 408 or in application 404.

Administrative server 301 may further include a communications adapter 409 coupled to bus 402. Communications adapter 409 interconnects bus 402 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, an administrator of the cloud computing environment may build a reusable pattern which defines the topology and application environment used to service the customer (i.e., the user receiving the services provided by the cloud computing environment) as well as satisfies the customer requirements, such as application and processing requirements. The pattern is an abstract model of the topology and application environment that encapsulates the installation, configuration and management of middleware and applications, such as the middleware and applications that run on the virtual machines in the physical cloud computing nodes. Such a pattern can be deployed repeatedly thereby avoiding the need to provision these environments individually and manually. Currently, such a pattern is built using only the software components that are accessible from external repositories from the same vendor. Patterns cannot currently be built using software components from separate external repositories from different vendors. As a result, it becomes more difficult to build a pattern that satisfies the customer's requirements. Furthermore, since patterns can only be built using software components stored in external repositories from the same vendor, there is not currently a means for deriving relationships between various software components from different vendors.

The principles of the present invention provide a means for building a pattern using software components from external repositories from different vendors as well as displaying to the user, in connection with building the pattern, relationship linkages between software components along with configuration metadata required to make a successful linkage thereby enabling the software components along with the linkages to be dynamically provisioned as discussed further below in connection with FIGS. 5A-5B.

Figure 5A:
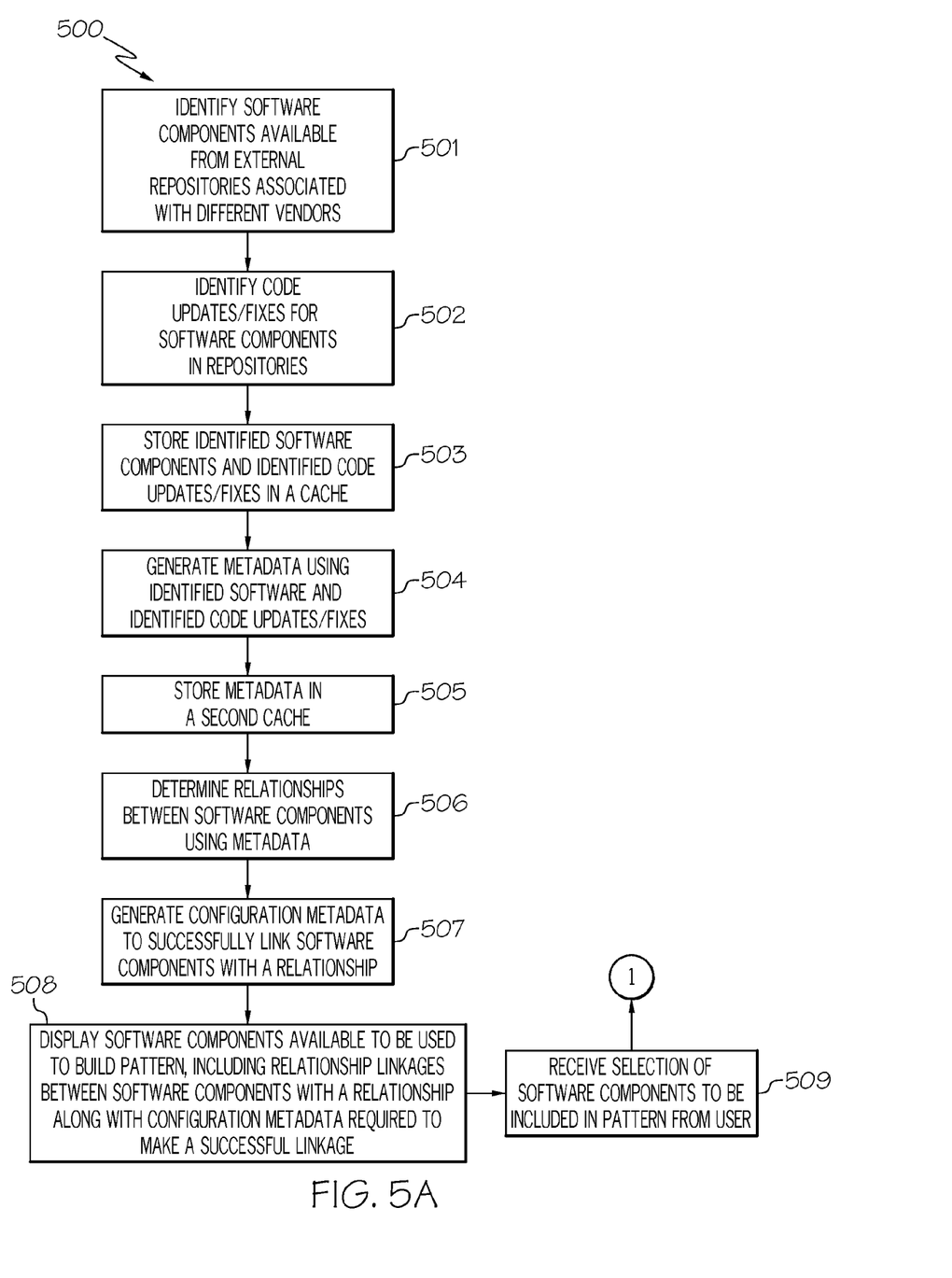
FIGS. 5A-5B are a flowchart of a method for building a pattern using software components from external repositories from different vendors in accordance with an embodiment of the present invention.
Figure 5B:
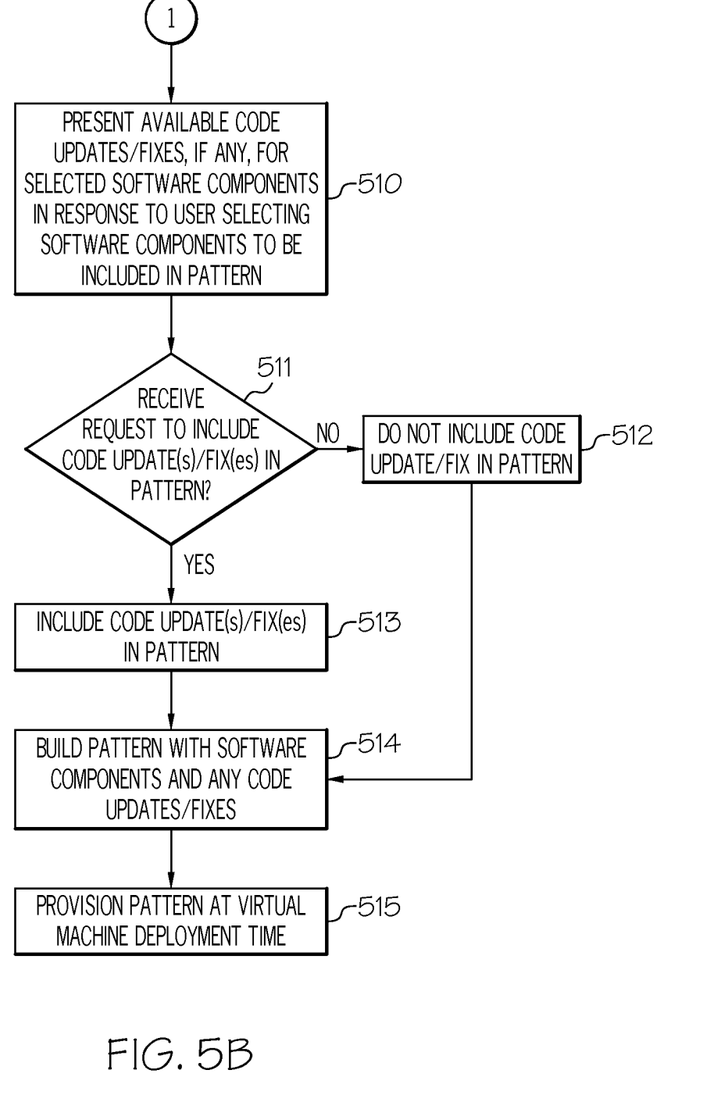

FIGS. 5A-5B are a flowchart of a method 500 for building a pattern using software components from external repositories 313 (FIG. 3) from different vendors in accordance with an embodiment of the present invention.

Referring to FIG. 5A, in conjunction with FIGS. 1-4, in step 501, external framework engine 312 identifies software components (e.g., application server, database server) available from repositories 313 associated with different vendors.

In step 502, external framework engine 312 identifies the code updates and/or code fixes (e.g., interim fixes, fix packs) (the phrase "code updates/fixes" in FIGS. 5A and 5B refers to code updates and/or code fixes) for the software components stored in repositories 313.

In step 503, external framework engine 312 stores the identified software components and code updates and/or code fixes, such as in cache 315. In one embodiment, cache 315 is used to hold the raw data from repository 313, such as software components and code updates and/or code fixes, so as to avoid the lengthy time in querying repository 313 to obtain the requested data for future requests for the same data.

In step 504, external framework engine 312 generates metadata using the identified software and identified code updates and/or code fixes. The metadata may be used to determine the relationships between the software components. For example, the metadata may include information, such as name, description, products that the update supports, update classification, download URL, applicability rules, and so on. The metadata may be used to determine any relationships between the software components.

In step 505, external framework engine 312 stores the generated metadata, such as in cache 316.

In step 506, external framework engine 312 determines the relationships between the software components using the generated metadata as discussed above.

In step 507, external framework engine 312 generates configuration metadata to successfully link software components with a relationship. In one embodiment, the configuration metadata is stored in cache 316. The configuration metadata includes data that is required to make a successful linkage (e.g., database name, port) between the software components.

In step 508, external framework engine 312 displays the software components available to be used to build the pattern, including the relationship linkages between the software components with a relationship along with the configuration metadata required to make a successful linkage. In this manner, the user (e.g., user of client device 101) will be able to build a pattern using software components and code updates and/or code fixes provided from different vendors. Furthermore, the user will be able to understand the relationship linkages between the software components and be able to provision these software components along with the linkages dynamically as discussed further below.

In step 509, external framework engine 312 receives a selection of software components out of the software components displayed in step 508 to be included in the pattern from the user.

Referring now to FIG. 5B, in conjunction with FIGS. 1-4, in step 510, external framework engine 312 presents the available code updates and/or code fixes, if any, for the selected software components (software components selected in step 509 of FIG. 5A) to the user in response to the user selecting the software components to be included in the pattern in step 509.

In step 511, a determination is made by external framework engine 312 as to whether the user provided a request to include any of the presented code updates and/or code fixes in the pattern.

If the user did not provide a request to include any of the presented code updates and/or code fixes in the pattern, then, in step 512, the pattern will not include any code updates and/or code fixes.

If, however, the user provided a request to include one or more of the code updates and/or code fixes presented to the user in step 510 in the pattern, then, in step 513, external framework engine 312 will include those code updates and/or code fixes selected by the user in the pattern.

In step 514, external framework engine 312 builds the pattern with the selected software components and the selected code updates and/or code fixes, if any.

In step 515, external framework engine 312 provisions the pattern at the virtual machine deployment time. As discussed above, the pattern is an abstract model of the topology and application environment that encapsulates the installation, configuration and management of middleware and applications, such as the middleware and applications that run on virtual machines 309. As a result, the software components and any code updates and/or code fixes are provisioned at the virtual machine deployment time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for building a pattern, the method comprising:
   identifying software components available from a plurality of external repositories associated with multiple vendors;
   identifying code updates and/or code fixes for software components stored in said plurality of external repositories;

generating metadata using said identified software components and said identified code updates and/or code fixes;
determining, by a processor, relationships between said identified software components using said metadata;
generating configuration metadata to successfully link software components with a relationship;
displaying said identified software components available to be used to build said pattern as well as relationship linkages between said software components with said relationship along with said configuration metadata;
receiving a selection of one or more software components from said displayed software components to be included in said pattern; and
building said pattern with said selected one or more software components.

2. The method as recited in claim 1 further comprising:
presenting available code updates and/or code fixes for one or more of said one or more selected software components to a user in response to said user selecting said one or more software components to be included in said pattern.

3. The method as recited in claim 2 further comprising:
including one or more of said code updates and/or code fixes presented to said user in said pattern in response to said user selecting said one or more code updates and/or code fixes to be included in said pattern.

4. The method as recited in claim 3 further comprising:
building said pattern with said selected one or more software components and said selected one or more code updates and/or code fixes.

5. The method as recited in claim 4 further comprising:
provisioning said pattern at a virtual machine deployment time.

\* \* \* \* \*